(12) United States Patent
Lin et al.

(10) Patent No.: US 11,386,035 B2
(45) Date of Patent: Jul. 12, 2022

(54) ELECTRONIC SYSTEM

(71) Applicants: Jhihhong Lin, Hsinchu County (TW); Jiang Shiuan Huang, Changhua County (TW)

(72) Inventors: Jhihhong Lin, Hsinchu County (TW); Jiang Shiuan Huang, Changhua County (TW)

(73) Assignee: ITE Tech. Inc., Hsinchu (TW)

( * ) Notice: Subject to any disclaimer, the term of this patent is extended or adjusted under 35 U.S.C. 154(b) by 18 days.

(21) Appl. No.: 17/035,696

(22) Filed: Sep. 29, 2020

(65) Prior Publication Data

US 2022/0004518 A1    Jan. 6, 2022

(30) Foreign Application Priority Data

Jul. 3, 2020  (TW) ................................ 109122530

(51) Int. Cl.
    *G06F 13/42*      (2006.01)
    *G06F 11/10*      (2006.01)
    *G06F 1/04*      (2006.01)

(52) U.S. Cl.
    CPC ............ *G06F 13/4282* (2013.01); *G06F 1/04* (2013.01); *G06F 11/1004* (2013.01)

(58) Field of Classification Search
    CPC ..... G06F 1/04; G06F 11/1004; G06F 13/4282
    See application file for complete search history.

(56) References Cited

U.S. PATENT DOCUMENTS

2014/0201301 A1* 7/2014 Bradley .................. G06F 8/654
    709/208
2017/0185559 A1* 6/2017 Hunsaker .............. G06F 13/362

(Continued)

FOREIGN PATENT DOCUMENTS

TW     201541257     11/2015
TW     201633162     9/2016
(Continued)

OTHER PUBLICATIONS

Intel, Enhanced Serial Peripheral Interface (eSPI), Jan. 2016, version 1.0 (Year: 2016).*

(Continued)

*Primary Examiner* — Henry Tsai
*Assistant Examiner* — Christopher A Daley
(74) *Attorney, Agent, or Firm* — JCIRPNET

(57) ABSTRACT

An electronic system is provided. The electronic system includes a platform controller and a plurality of peripheral devices. The platform controller has a first bus. The plurality of peripheral devices are respectively connected to the platform controller through the first bus. The plurality of peripheral devices include a master peripheral device and a slave peripheral device. The master peripheral device is connected to the slave peripheral device through a communication signal line. The master peripheral device communicates with the platform controller through the first bus. When the master peripheral device receives a communication request from the slave peripheral device through the communication signal line, the master peripheral device provides a communication signal corresponding to the communication request to the first bus, so the slave peripheral device communicates with the platform controller through the first bus.

18 Claims, 5 Drawing Sheets

(56) References Cited

U.S. PATENT DOCUMENTS

| | | | |
|---|---|---|---|
| 2018/0246830 A1* | 8/2018 | Zhu | G06F 13/364 |
| 2019/0129880 A1* | 5/2019 | Zhu | G06F 13/4282 |
| 2019/0251010 A1* | 8/2019 | Bhutada | G06F 11/0784 |

FOREIGN PATENT DOCUMENTS

| | | |
|---|---|---|
| TW | 201737104 | 10/2017 |
| TW | 201820163 | 6/2018 |

OTHER PUBLICATIONS

"Office Action of Taiwan Counterpart Application", dated Feb. 25, 2022, p. 1-p. 4.

\* cited by examiner

ELECTRONIC SYSTEM

CROSS-REFERENCE TO RELATED APPLICATION

This application claims the priority benefit of Taiwan application serial no. 109122530, filed on Jul. 3, 2020. The entirety of the above-mentioned patent application is hereby incorporated by reference herein and made a part of this specification.

BACKGROUND

Technical Field

The disclosure relates to a system, and particularly relates to an electronic system.

Description of Related Art

In an electronic system of the related art, a platform controller may only be connected to a single peripheral device through a single enhanced serial peripheral interface (eSPI) bus, so that when a plurality of peripheral devices are to be controlled or read, a plurality of buses must be used to connect the peripheral devices in order to implement control or reading operations of the peripheral devices. Therefore, in a conventional electronic system, communication and connection between the platform controller and the peripheral devices may not only increase the manufacturing cost of the electronic system, but the number of the peripheral devices connected to the electronic system is also limited by the number of physical buses, resulting in poor compatibility of the electronic system.

SUMMARY

The invention is directed to an electronic system, in which a platform controller is capable of simultaneously connecting a plurality of peripheral devices through a single bus.

The invention provides an electronic system including a platform controller and a plurality of peripheral devices. The platform controller has a first bus. The peripheral devices are respectively connected to the platform controller through the first bus. The peripheral devices include a master peripheral device and a slave peripheral device. The master peripheral device and the slave peripheral device are connected to a communication signal line. The master peripheral device communicates with the platform controller through the first bus. When the master peripheral device receives a communication request from the slave peripheral device through the communication signal line, the master peripheral device provides a communication signal corresponding to the communication request to the first bus, so that the slave peripheral device communicates with the platform controller through the first bus.

The invention provides an electronic system including a platform controller and a plurality of peripheral devices. The platform controller has a first bus. The peripheral devices are respectively connected to the platform controller through the first bus. The peripheral devices include a master peripheral device and a slave peripheral device. The master peripheral device and the slave peripheral device are connected to an interrupt signal line. The master peripheral device communicates with the platform controller through the first bus. When the master peripheral device receives an interrupt request provided by the slave peripheral device from the interrupt signal line, the master peripheral device provides an interrupt signal to the platform controller through the first bus, and the platform controller communicates with the slave peripheral device through the first bus according to the interrupt signal.

Based on the above description, the platform controller of the electronic system may be simultaneously connected to a plurality of peripheral devices through a single bus, and the peripheral devices do not cause signal conflicts on the bus.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
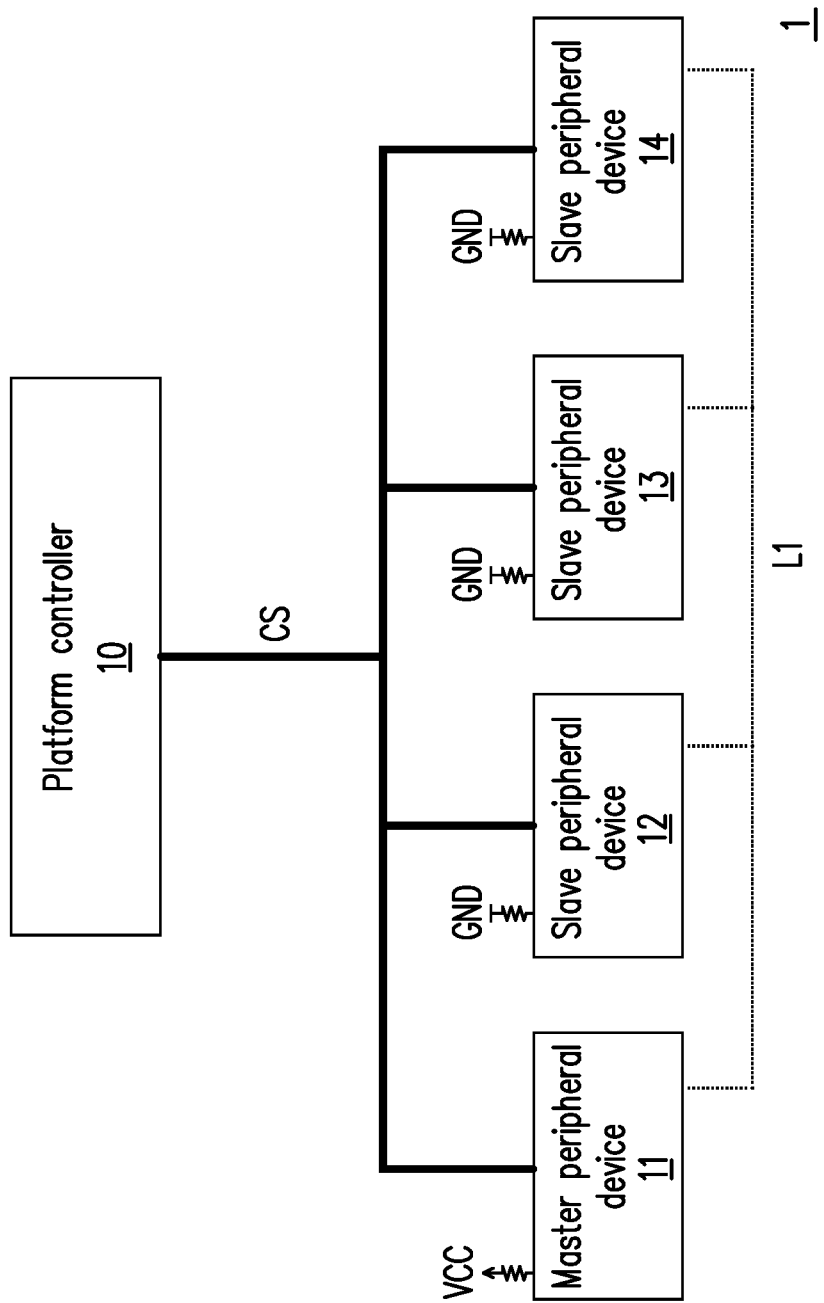
FIG. 1A is a schematic diagram of an electronic system according to an embodiment of the invention.

FIG. 1A is a schematic diagram of an electronic system 1 according to an embodiment of the invention. The electronic system 1 includes a platform controller 10, and a plurality of peripheral devices 11-14. The platform controller 10 is connected to the peripheral devices 11-14 through a bus CS, and the platform controller 10 may communicate with the peripheral device 11-14 through the single bus CS. In an embodiment, the platform controller 10 is, for example, a platform controller hub (PCH), and the bus CS may be a bus compatible with an enhanced serial peripheral interface (eSPI), to connect the platform controller 10 and the peripheral devices 11-14. Although the exemplary embodiment shown in FIG. 1 is taken as an example for description, i.e., the connection relationship that the platform controller 10 in the electronic system 1 is connected to the four peripheral devices 11-14, those of ordinary skills in the art may surely adjust the number of the peripheral devices connected to the platform controller 10 in the electronic system 1, so that the electronic system 1 may adaptively meet different design requirements and usage concepts.

Since the peripheral devices 11-14 communicate with the platform controller 10 only through the single bus CS, in order to avoid signal conflicts caused by multiple peripheral devices 11-14 communicating on the bus CS at the same time, one of the peripheral devices 11-14 (the peripheral device 11) may be preset as a master peripheral device, and the other peripheral devices 12-14 may be set as slave peripheral devices. In this way, the master peripheral device of the peripheral devices 11-14 may be responsible for most of the communications on the bus CS, and the other slave peripheral devices may monitor the communication content on the bus, and when communications of the slave peripheral devices are required, the slave peripheral devices may notify the master peripheral device, and the master peripheral device communicates with the platform controller 10.

In an embodiment, the peripheral devices 11-14 may respectively have setting pins, respectively, and the peripheral devices 11-14 may be set as the master peripheral device or the slave peripheral devices according to voltages received by the setting pins. For example, as shown in FIG. 1, the peripheral device 11 is set as the master peripheral device as the setting pin receives an operating voltage VCC, and the other peripheral devices 12-14 are set as the slave peripheral devices 12-14 as the setting pins receive a ground voltage GND.

Further, the peripheral devices 11-14 have an interconnected communication signal line L1 to communicate with each other, and when one or more of the slave peripheral devices 12-14 want to communicate, the slave peripheral devices 12-14 may provide communication requests to the communication signal line L1. When the master peripheral device 11 receives the communication requests through the communication signal line L1, it learns that one or more of the slave peripheral devices 12-14 want to communicate with the platform controller 10, and the master peripheral device 11 may provide a communication signal to the platform controller 10 through the bus CS, and the platform controller 10 may communicate with one or more of the slave peripheral devices 12-14 according to the communication signal.

Figure 2:
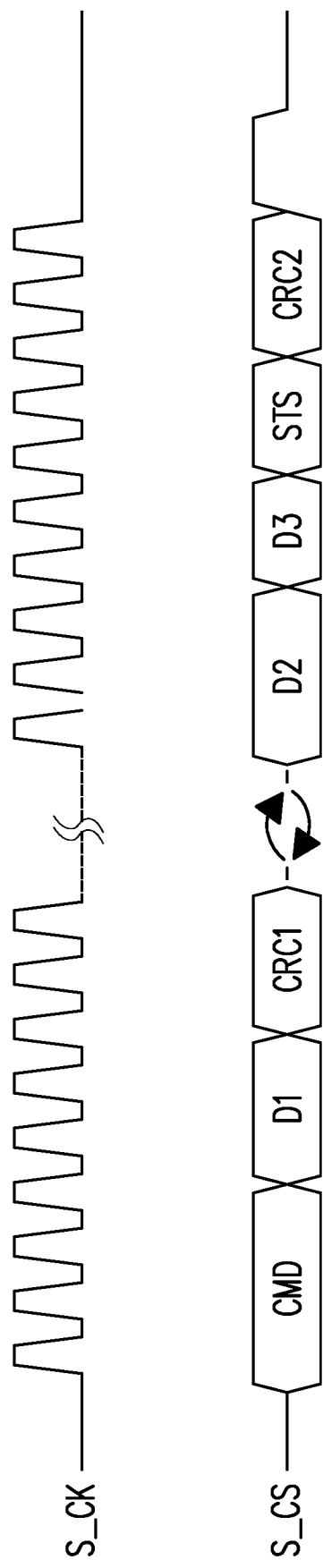
FIG. 2 is a signal waveform diagram of an electronic system according to an embodiment of the invention.

Referring to FIG. 1A and FIG. 2, FIG. 2 is a signal waveform diagram of the electronic system 1 according to an embodiment of the invention. The platform controller 10 and the peripheral devices 11-14 may communicate through the bus CS according to a clock signal S_CK to generate a bus signal S_CS. More precisely, the clock signal S_CK is a signal for the platform controller 10 to communicate with the peripheral devices 11-14 when the platform controller 10 wants to communicate with one of the slave peripheral devices 12-14. Therefore, the clock signal S_CK may be, for example, an input/output read command signal or a memory read command signal, which instructs to communicate with one of the slave peripheral devices 12-14.

The bus signal S_CS includes a command time interval CMD, a time interval D1, a cyclic redundancy check interval CRC1, time intervals D2 and D3, a state interval STS, and a cyclic redundancy check interval CRC2. Further, in the command time interval CMD, the time interval D1, and the cyclic redundancy check interval CRC1, the signal of the bus signal S_CS may be provided to the bus CS by the platform controller 10 for the peripheral devices 11-14 to read. Then, after turn around (TAR), in the time intervals D2 and D3, the state interval STS and the cyclic redundancy check interval CRC2, in response to a command signal of the platform controller 10, the signal of the bus signal S_CS may be provided to the bus CS from one of the master periphery device 11 and the slave peripheral devices 12-14 to provide data to be read by the platform controller 10. Therefore, the platform controller 10 may provide a read command signal according to the bus signal S_CS and instruct the peripheral devices 11-14 to provide the data to be read.

In the command time interval CMD, the platform controller 10 may provide a command code to the bus CS, and the peripheral devices 11-14 may determine operation content to be performed by the platform controller 10 according to the command code. The command code provided by the platform controller 10 may be, for example, a command code of an input/output read command (for example, PUT_IORD_SHORT) or a memory read command (for example, PUT_MEMRD32_SHORT), so that the peripheral devices 11-14 may learn the operation content to be performed by the platform controller 10 according to the command code received in the command time interval CMD.

In the time interval D1, the platform controller 10 may provide address information to the bus CS. The peripheral devices 11-14 may read the address information and determine a reading target of the platform controller 10. Further, the address information stores physical address information (for example, 32-byte physical address information) to be read by the platform controller 10, and each of the peripheral devices 11-14 may respectively determine whether it is the reading object of the platform controller 10 after reading the address information, and when the peripheral devices 11-14 determine to correspond to the reading object of the platform controller 10 according to the address information, the corresponding peripheral devices 11-14 respond to the read command or the memory read command of the platform controller 10 through the bus CS in a subsequent time interval.

In the cyclic redundancy check interval CRC1, the platform controller 10 may provide a corresponding verification code to the bus CS according to data content transmitted in the command time interval CMD and the time interval D1, and the peripheral devices 11-14 determine whether the data received in the command time interval CMD and the time interval D1 is correct according to the verification code.

In the time interval D2, the master peripheral device 11 may detect the communication signal line L1 to determine whether the slave peripheral devices 12-14 need to transmit data. When the master peripheral device 11 receives a communication request from the communication signal line L1, the master peripheral device 11 may provide a communication signal to the platform controller 10 through the bus CS, and one or more of the slave peripheral devices 12-14 may communicate with the platform controller 10 through the bus CS.

When the address information provided by the platform controller 10 in the time interval D1 corresponds to the slave peripheral device 12, it represents that the platform controller 10 intends to perform a read operation on the slave peripheral device 12. The master peripheral device 11 may detect a voltage level of the communication signal line L1 to determine whether the communication request is received. For example, the communication signal line L1 may be driven by a driving circuit (not shown in FIG. 1A) in the electronic system 1 to set the voltage level of the communication signal line L1 to a first voltage level (for example, a high voltage level). When the slave peripheral device 12 changes the voltage level of the communication signal line L1 from the first voltage level (for example, the high voltage level) to a second voltage level (for example, a low voltage level), the master peripheral device 11 detects the above voltage level change of the communication signal line L1, and determines that the communication request provided by one of the slave peripheral device 12-14 is received. Therefore, the master peripheral device 11 may provide a wait signal (for example, WAIT_STATE) of the communication signal to the bus CS. Then, when the slave peripheral device 12 reads or obtains the data content to be read by the platform controller 10, the slave peripheral device 12 may change the voltage level of the communication signal line L1 from the second voltage level (for example, the low voltage level) to the first voltage level (for example, the high voltage level). In this way, the master peripheral device 11 may provide an accept signal (for example, ACCEPT) of the communication signal to the bus CS. Therefore, the platform controller 10 may receive the communication signal including the wait signal and the accept signal in the time interval D2 to better determine whether the read command is correctly transmitted to the peripheral devices 11-14 and whether the peripheral devices 11-14 are in a ready state for reading.

In the time interval D3, the master peripheral device 11 does not provide a signal to the bus CS, but the slave peripheral device 12 that provides the communication request provides data to the bus CS to avoid data conflicts on the bus CS. The platform controller 10 may obtain the data to be read according to the data in the time interval D3.

In the state interval STS, the master peripheral device 11 and the platform controller 10 may provide a state of data transmission through the bus CS, for example, information about whether the peripheral devices 11-14 still have data to be transmitted, or whether the data to be transmitted is ready for transmission, etc.

In the cyclic redundancy check interval CRC2, the master peripheral device 11 may provide the corresponding verification codes to the bus CS according to the data content transmitted in the time intervals D2, D3 and the state interval STS, so that the platform controller 10 may determine whether the data received in the time intervals D2, D3 and the state interval STS is correct according to the verification codes.

Therefore, the platform controller 10 in the electronic system 1 may be connected to a plurality of the peripheral devices 11-14 through the single bus CS. By configuring the master peripheral device and the slave peripheral devices of the peripheral devices 11-14, the master peripheral device 11 may effectively integrate and manage communications of the peripheral devices 11-14 with the platform controller 10 on the bus CS through the communication signal line L1, so that the electronic system 1 may be simultaneously connected to a plurality of the peripheral devices 11-14 without signal conflicts on the bus CS, thereby reducing the manufacturing cost of the electronic system 1 and improving the scalability of the electronic system 1 at the same time.

Figure 1B:
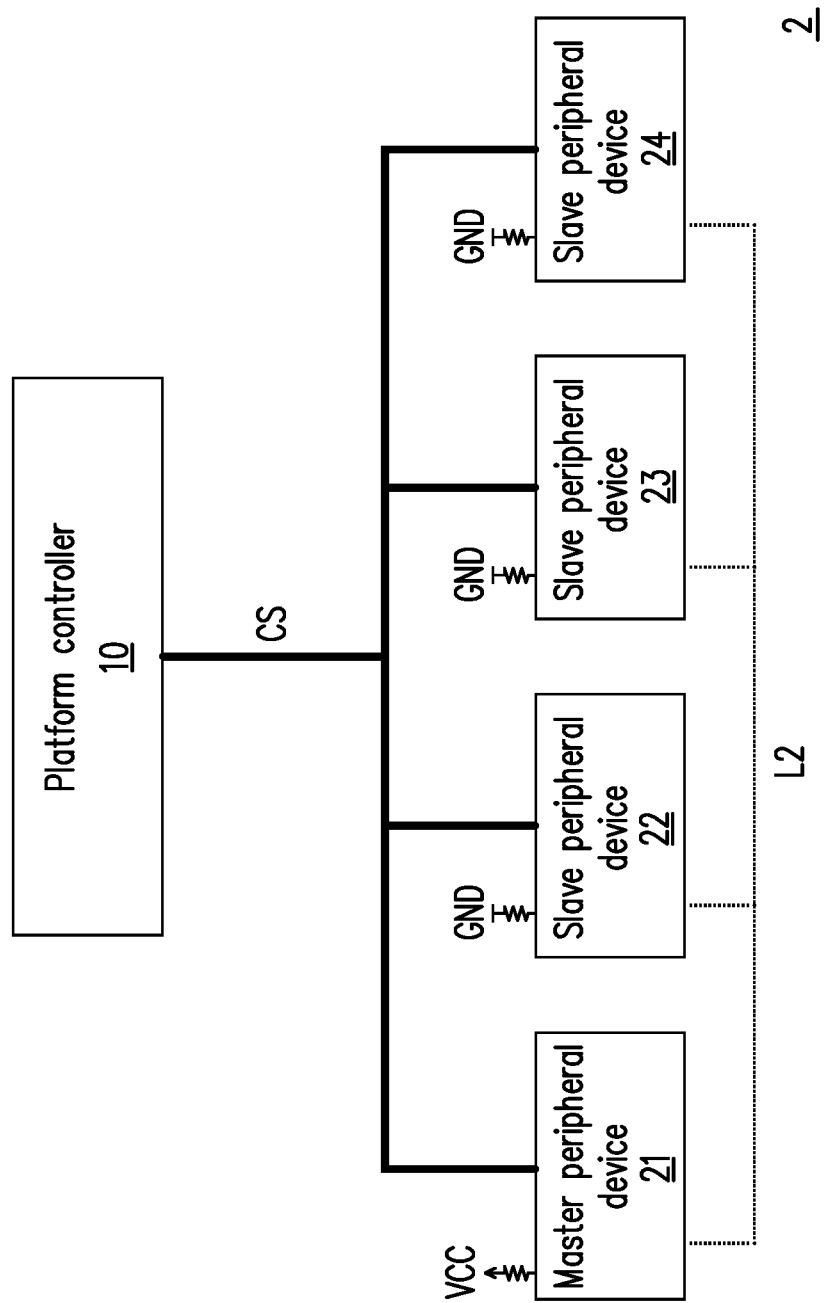
FIG. 1B is a schematic diagram of an electronic system according to an embodiment of the invention.

Then, referring to FIG. 1B, FIG. 1B is a schematic diagram of an electronic system 2 according to an embodiment of the invention. The electronic system 2 shown in FIG. 1B is similar to the electronic system 1 shown in FIG. 1A, so the same components are marked with the same symbols. Differences between FIG. 1A and FIG. 1B are that the peripheral devices 11-14 in FIG. 1A are respectively replaced by peripheral devices 21-24 in FIG. 1B, and the communication signal line L1 in FIG. 1A is replaced by an interrupt signal line L2 in FIG. 1B. In the electronic system 2, the peripheral device 21 is set as the master peripheral device 21 and the peripheral devices 22-24 are set as the slave peripheral devices 22-24. The peripheral devices 21-24 are connected to each other through the interrupt signal line L2.

In the electronic system 2, in order to avoid signal conflicts, the master peripheral device 21 may be responsible for most of the communications on the bus CS to communicate with the platform controller 10. When one of the slave peripheral devices 22-24 needs to send an interrupt request and needs to communicate with the platform controller 10, the slave peripheral devices 22-24 may provide an interrupt request through the interrupt signal line L2 to notify the master peripheral device 21, and the master peripheral device 21 sends an interrupt request (IRQ) to the platform controller 10.

Figure 3A:
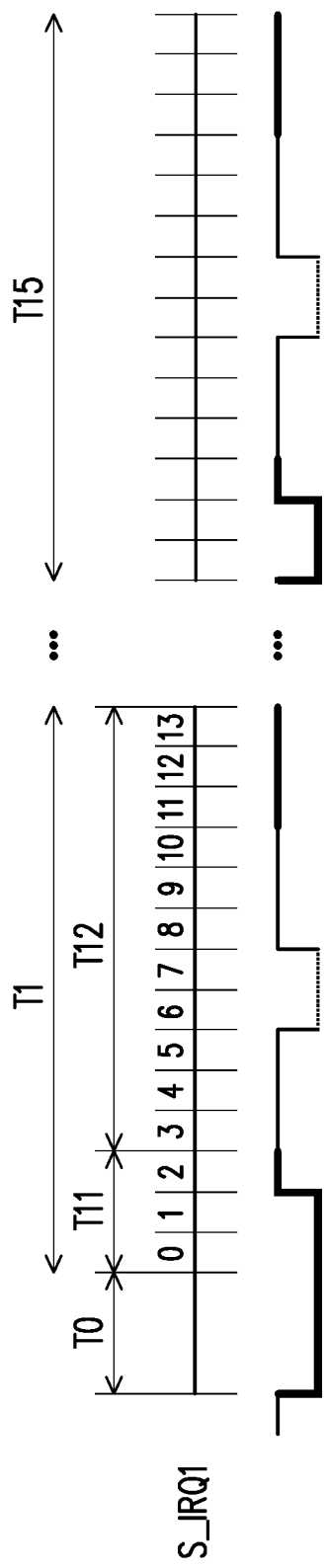
FIG. 3A and FIG. 3B are signal waveform diagrams of an interrupt signal line according to an embodiment of the invention.
Figure 3B:
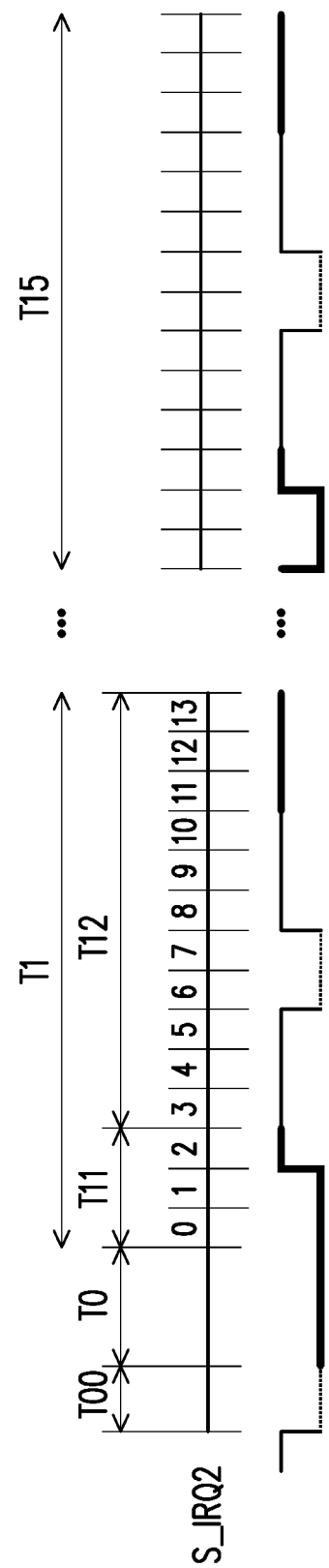

Then, referring to FIG. 1B, FIG. 3A and FIG. 3B, FIG. 3A and FIG. 3B are signal waveform diagrams of the interrupt signal line L2 according to an embodiment of the invention.

In detail, when one or more of the slave peripheral devices 22-24 send the interrupt request to the master peripheral device 21 through the interrupt signal line L2, the master peripheral device 21 may determine whether to send the interrupt request (IRQ) to the platform controller 10 by monitoring the signal on the interrupt signal line L2.

An interrupt request signal S_IRQ1 shown in FIG. 3A is a signal waveform diagram on the interrupt signal line L2. The signal waveform diagram of the interrupt request signal S_IRQ1 has thin lines, thick lines, and dotted lines. The thin lines represent that the interrupt signal line L2 is driven by a driving circuit (not shown in FIG. 1B) in the electronic system 2 to set the voltage level of the interrupt signal line L2 to the first voltage level (for example, the high voltage level)). The thick lines represent that the interrupt request signal S_IRQ1 on the interrupt signal line L2 is driven by the master peripheral device 21 to change the voltage level. The dotted lines represent that the interrupt request signal S_IRQ1 on the interrupt signal line L2 is driven by one or more of the slave peripheral devices 22-24 to change the voltage level.

As shown in FIG. 3A, in the interrupt request signal S_IRQ1, the interrupt request signal S_IRQ1 has a reset time interval T0 and a plurality of sub-time intervals T1~T15. The sub-time intervals T1-T15 may commonly constitute an interrupt request time interval in the interrupt request signal S_IRQ1, and the reset time interval T0 may be ahead of the interrupt request time interval. Although a number of the sub-time intervals shown in FIG. 3A is 15, the number of the sub-time intervals may be adjusted according to different design requirements, and is not limited by the invention.

In the reset time interval T0, the master peripheral device 21 may change the voltage level of the interrupt signal line L2 from the first voltage level (for example, the high voltage level) to the second voltage level (for example, the low voltage level) to provide a reset signal to the interrupt signal line L2, such that the slave peripheral devices 22-24 may perform reset operations according to the reset signal. For example, the reset signal may be a second voltage level signal (for example, the low voltage level) that lasts for 16 time periods.

In the sub-time intervals T1-T15 after the reset time interval T0, the sub-time intervals T1-T15 may respectively have a synchronization time interval and a signal determination time interval. The master peripheral device 21 may provide a synchronization signal during the synchronization time interval to synchronize the operations of each of the slave peripheral devices 22-24, and let each of the slave peripheral devices 22-24 to distinguish each of the sub-time intervals. Then, in the signal determination time interval after the synchronization time interval, one or more of the slave peripheral devices 22-24 may provide an interrupt request to the interrupt signal line L2, and the master peripheral device 21 may detect the interrupt signal line L2 to determine whether the interrupt request is received.

Taking the sub-time interval T1 as an example, in a synchronization time interval T11, the master peripheral device 21 may provide a synchronization signal to the interrupt signal line L2 to synchronize the operations of the slave peripheral devices 22-24, and the slave peripheral devices 22-24 may identify the sub-time interval T1 according to the synchronization signal. For example, the synchronization signal may be the second voltage level signal (for example, the low voltage level) that lasts for 2 time periods.

In a signal determination time interval T12 after the synchronization time interval T11, one or more of the slave peripheral devices 22-24 may provide an interrupt request to the interrupt signal line L2. In detail, the sub-time intervals T1-T15 may correspond to different interrupt request types, and the master peripheral device 21 may determine the interrupt request type to be provided by the slave peripheral devices 22-24 according to the sub-time interval when the interrupt request is received. For example, one or more of the slave peripheral devices 22-24 may change the voltage level on the interrupt signal line L2 from the first voltage level (for example, the high voltage level) to the second voltage level (for example, the low voltage level), and last for 2 time periods to provide the interrupt request to the interrupt signal line L2. The voltage level on the interrupt signal line L2 may be changed back to the first voltage level (for example, the high voltage level) by the driving circuit (not shown in FIG. 1B) in the electronic system 2 after one or more of the slave peripheral devices 22-24 provide the interrupt request.

In the embodiment, the master peripheral device 21 proceeds with the reset time interval T0 and the sub-time intervals T1-T15 to determine whether to send an interrupt request to the platform controller 10 according to the interrupt request sent by the slave peripheral devices 22-24. After the reset time interval T0 and the sub-time intervals T1-T15 are ended, the master peripheral device 21 periodically repeats the reset time interval T0 and the sub-time intervals T1-T15 to continuously detect whether the slave peripheral devices 22-24 intend to send the interrupt request.

As shown in FIG. 3B, in the interrupt request signal S_IRQ2, the interrupt request signal S_IRQ2 has an enable time interval T00, the reset time interval T0, and a plurality of sub-time intervals T1-T15. Operation details of the reset time interval T0 and the sub-time intervals T1-T15 may refer to the related content of FIG. 3A described above, which are not repeated. A difference between the interrupt request signal S_IRQ1 and the interrupt request signal S_IRQ2 is that the interrupt request signal S_IRQ1 is a periodic signal, while the interrupt request signal S_IRQ2 is a one-time signal generated by one of the slave peripheral devices 22-24 after being triggered, and the voltage level on the interrupt signal line L2 may be driven by the driving circuit (not shown in FIG. 1B) in the electronic system 2, so that the voltage level on the interrupt signal line L2 may be set to the first voltage level (for example, the high voltage level).

In the enable time interval T00 of the interrupt request signal S_IRQ2, one of the slave peripheral devices 22-24 may provide an enable signal to the interrupt signal line L2, so as to change the voltage level on the interrupt signal line L2 from the first voltage level (for example, the high voltage level) to the second voltage level (for example, the low voltage level). For example, the enable signal may be the second voltage level signal (for example, the low voltage level) that lasts for 3 time periods. After receiving the enable signal, the master peripheral device 21 may learn that one of the slave peripheral devices 22-24 needs to send an interrupt request, so that the master peripheral element 21 may proceed with the one-time reset time interval T0 and the sub-time intervals T1-T15 after the enable time interval T00 to determine the type of interrupt request to be provided. After the reset time interval T0 and the interrupt request time interval (the sub-time intervals T1-T15) are ended, the voltage level on the interrupt signal line L2 may be driven to the first voltage level (for example, the high voltage level) by the driving circuit of the electronic system 2. The master peripheral device 21 may wait for trigger of the next enable signal before the master peripheral device 21 repeats the reset time interval T0 and the interrupt request time interval (the sub-time intervals T1-T15).

Therefore, in the electronic system 2, the platform controller 10 may be connected to a plurality of the peripheral devices 21-24 through the single bus CS. The peripheral devices 21-24 may effectively integrate whether the peripheral devices 21-24 need to send an interrupt request through the interrupt signal line L2, so that the electronic system 2 may be simultaneously connected to a plurality of the peripheral devices 21-24 without signal conflicts on the bus CS, thereby further reducing the manufacturing cost of the electronic system 2 and improving the scalability of the electronic system 2 at the same time.

Figure 1C:
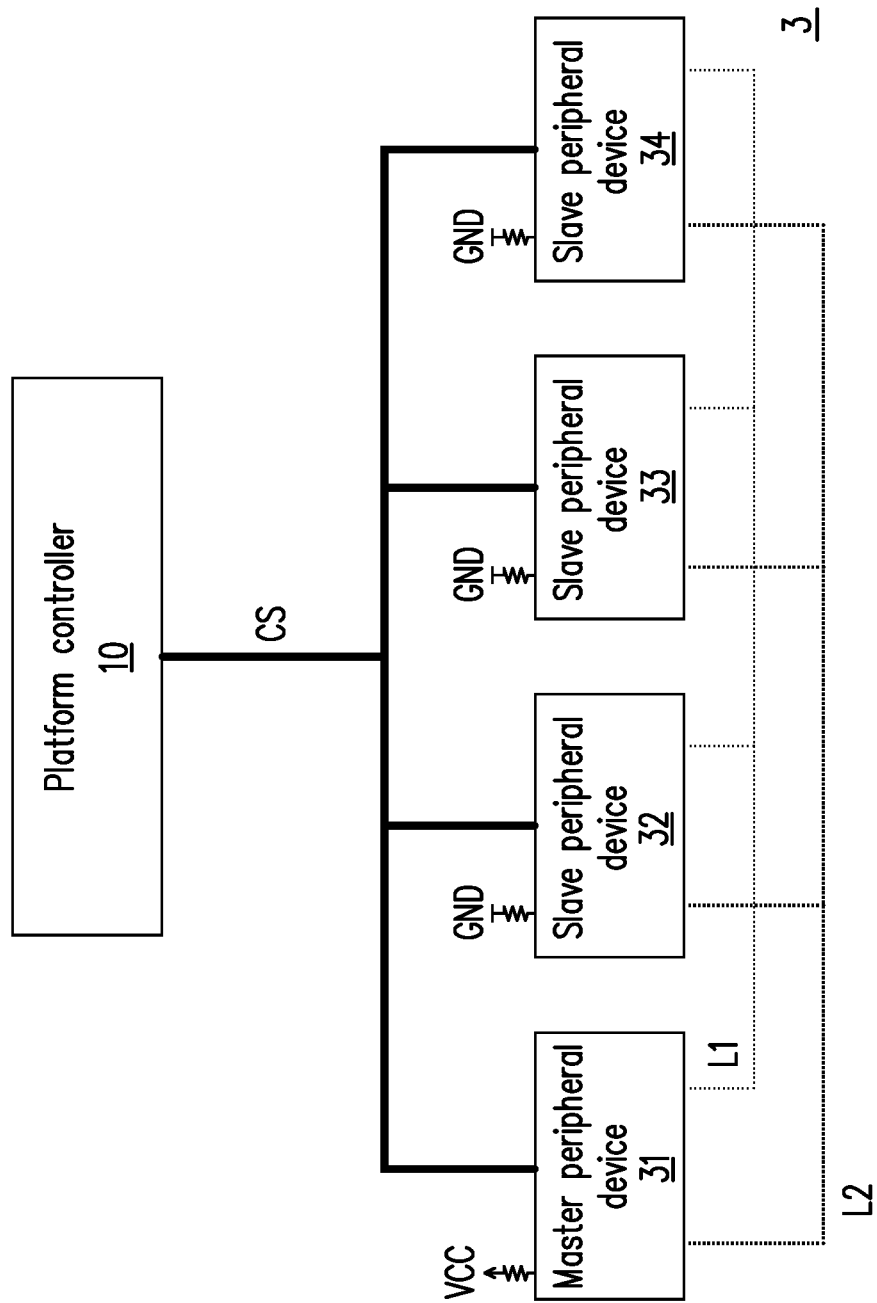
FIG. 1C is a schematic diagram of an electronic system according to an embodiment of the invention.

Referring to FIG. 1C, FIG. 1C is a schematic diagram of an electronic system 3 according to an embodiment of the invention. The electronic system 3 shown in FIG. 1C is similar to the electronic system 1 shown in FIG. 1A and the electronic system 2 shown in FIG. 1B, so that the same components are marked with the same symbols. A difference between FIG. 1A, FIG. 1B and FIG. 1C is that peripheral devices 31-34 in FIG. 1C have both of the communication signal line L1 and the interrupt signal line L2. Therefore, in the electronic system 3, the peripheral devices 31-34 may communicate with each other through the communication signal line L1 and the interrupt signal line L2 at the same time. The slave peripheral devices 32-34 may notify the master peripheral device 31 to communicate with the platform controller 10 on the bus CS, and the master peripheral device 31 determines whether the slave peripheral devices 32-34 need to send an interrupt request.

In summary, the platform controller in the electronic system may be simultaneously connected to a plurality of the peripheral devices through the single bus. By setting one of the peripheral devices as the master peripheral device and setting the other peripheral devices as the slave peripheral devices, the master peripheral device may integrate communications between the slave peripheral devices and the platform controller through the communication signal line and/or the interrupt signal line interconnected to the peripheral devices, or determine whether the slave peripheral devices need to send the interrupt request. In this way, in case that the platform controller in the electronic system is simultaneously connected to a plurality of the peripheral devices through the single bus, signal conflicts may also be effectively avoided, thereby reducing the manufacturing cost of the electronic system and improving the scalability of the electronic system at the same time.

What is claimed is:

1. An electronic system comprising:
a platform controller having a first bus; and
a plurality of peripheral devices respectively connected to the platform controller through the same first bus, the peripheral devices comprising:
a first peripheral device and a second peripheral device, wherein the first peripheral device and the second peripheral device are connected to a communication signal line, and the first peripheral device communicates with the platform controller through the first bus,
wherein when the first peripheral device receives a communication request from the second peripheral device through the communication signal line, the first peripheral device provides a communication signal corresponding to the communication request to the first bus, so that the second peripheral device communicates with the platform controller through the first bus.

2. The electronic system as claimed in claim 1, wherein when the second peripheral device receives address information corresponding to the second peripheral device from the first bus in a first data time interval, the second peripheral device provides the communication request to the first peripheral device through the communication signal line.

3. The electronic system as claimed in claim 2, wherein the second peripheral device changes the communication signal line from a first voltage level to a second voltage level to provide the communication request to the first peripheral device.

4. The electronic system as claimed in claim 3, wherein when the first peripheral device detects that the communication signal line is changed from the first voltage level to the second voltage level, the first peripheral device provides a wait signal of the communication signal to the first bus in a second data time interval after the first data time interval,
wherein when the first peripheral device detects that the communication signal line is changed from the second voltage level to the first voltage level, the first peripheral device provides an accept signal of the communication signal to the first bus in the second data time interval.

5. The electronic system as claimed in claim 4, wherein the first voltage level is greater than the second voltage level.

6. The electronic system as claimed in claim 4, wherein the second peripheral device provides read data to the first bus in a third data time interval after the second data time interval to communicate with the platform controller.

7. The electronic system as claimed in claim 1, wherein the first peripheral device and the second peripheral device are further connected to an interrupt signal line, wherein when the first peripheral device receives an interrupt request provided by the second peripheral device through the interrupt signal line, the first peripheral device provides an interrupt signal to the platform controller through the first bus, and the platform controller communicates with the second peripheral device through the first bus according to the interrupt signal.

8. The electronic system as claimed in claim 7, wherein in an interrupt request time interval, the first peripheral device divides the interrupt request time interval into a plurality of sub-time intervals, and the first peripheral device provides the corresponding interrupt signal to the platform controller according to the corresponding sub-time interval in which the interrupt request is received.

9. The electronic system as claimed in claim 8, wherein the first peripheral device provides a reset signal to the interrupt signal line in a reset time interval before the interrupt request time interval, wherein each of the sub-time intervals has a synchronization time interval and a signal determination time interval, and the first peripheral device determines whether the interrupt request is received in the signal determination time interval of each of the sub-time intervals.

10. The electronic system as claimed in claim 9, wherein the first peripheral device provides a plurality of synchronization signals in the synchronization time interval of each of the sub-time intervals, and the second peripheral device identifies each of the sub-time intervals according to the synchronization signals.

11. The electronic system as claimed in claim 10, wherein the first peripheral device periodically provides the reset signal and the synchronization signals to the interrupt signal line.

12. The electronic system as claimed in claim 9, wherein after the first peripheral device receives an enable signal provided to the interrupt signal line by the second peripheral device, the first peripheral device provides the reset signal to the interrupt signal line.

13. An electronic system comprising:
a platform controller having a first bus; and
a plurality of peripheral devices respectively connected to the platform controller through the same first bus, the peripheral devices comprising:
a first peripheral device and a second peripheral device, wherein the first peripheral device and the second peripheral device are connected to an interrupt signal line, and the first peripheral device communicates with the platform controller through the first bus,
wherein when the first peripheral device receives an interrupt request provided by the second peripheral device from the interrupt signal line, the first peripheral device provides an interrupt signal to the platform controller through the first bus, and the platform controller communicates with the second peripheral device through the first bus according to the interrupt signal.

14. The electronic system as claimed in claim 13, wherein in an interrupt request time interval, the first peripheral device divides the interrupt request time interval into a plurality of sub-time intervals, and the first peripheral device provides the corresponding interrupt signal to the platform controller according to the corresponding sub-time interval in which the interrupt request is received.

15. The electronic system as claimed in claim 14, wherein the first peripheral device provides a reset signal to the interrupt signal line in a reset time interval before the interrupt request time interval, wherein each of the sub-time intervals has a synchronization time interval and a signal determination time interval, and the first peripheral device determines whether the interrupt request is received in the signal determination time interval of each of the sub-time intervals.

16. The electronic system as claimed in claim 14, wherein the first peripheral device provides a plurality of synchronization signals in the synchronization time interval of each of the sub-time intervals, and the second peripheral device identifies each of the sub-time intervals according to the synchronization signals.

17. The electronic system as claimed in claim 16, wherein the first peripheral device periodically provides the reset signal and the synchronization signals to the interrupt signal line.

18. The electronic system as claimed in claim 14, wherein after the first peripheral device receives an enable signal provided to the interrupt signal line by the second peripheral device, the first peripheral device provides the reset signal to the interrupt signal line.

* * * * *